US007155487B2

(12) United States Patent
Yau et al.

(10) Patent No.: US 7,155,487 B2
(45) Date of Patent: Dec. 26, 2006

(54) METHOD, SYSTEM AND ARTICLE OF MANUFACTURE FOR DATA DISTRIBUTION OVER A NETWORK

(75) Inventors: Cedric Tan Yau, Champaign, IL (US); Mikhail Voloshin, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 09/726,854

(22) Filed: Nov. 30, 2000

(65) Prior Publication Data

US 2002/0066026 A1  May 30, 2002

(51) Int. Cl.
G06F 15/167 (2006.01)
G06F 9/45 (2006.01)
G06F 15/16 (2006.01)
G06F 9/00 (2006.01)
G06F 17/00 (2006.01)

(52) U.S. Cl. .................. 709/213; 717/172; 726/11
(58) Field of Classification Search ............... 709/203, 709/242, 219, 231; 713/201, 200
See application file for complete search history.

(56) References Cited

U.S. PATENT DOCUMENTS

| 5,581,764 | A | 12/1996 | Fitzgerald et al. |
| 5,619,689 | A | 4/1997 | Kelly |
| 5,623,600 | A | 4/1997 | Ji et al. |
| 5,745,679 | A | 4/1998 | Mercer |
| 5,956,716 | A | 9/1999 | Kenner et al. |
| 5,961,596 | A | 10/1999 | Takubo et al. |
| 5,991,809 | A | 11/1999 | Kriegsman |
| 5,999,979 | A * | 12/1999 | Vellanki et al. ............. 709/232 |
| 6,003,030 | A | 12/1999 | Kenner et al. |
| 6,052,721 | A | 4/2000 | Shepherd et al. |
| 6,108,703 | A | 8/2000 | Leighton et al. |
| 6,108,707 | A | 8/2000 | Wiese |
| 6,215,903 | B1 * | 4/2001 | Cook ......................... 382/232 |
| 6,269,456 | B1 * | 7/2001 | Hodges et al. ................ 714/38 |
| 6,347,375 | B1 * | 2/2002 | Reinert et al. ............. 713/200 |
| 6,725,377 | B1 * | 4/2004 | Kouznetsov ................ 713/201 |
| 6,785,704 | B1 * | 8/2004 | McCanne ................... 718/105 |
| 6,842,861 | B1 * | 1/2005 | Cox et al. ................... 713/188 |

OTHER PUBLICATIONS

Windows NT 4.0 MCSE Study guide, ISBN: 0764530879, 1997.*
William Boswell, "Inside Windows 2000 Server", Dec. 22, 1999, ISBN: 1562059297.*
Hall, http://www.apl.jhu.edu/~hall/java/Servlet-Tutorial/Servlet-Tutorial-Response-Status-Line.html, Apr. 2000.*

* cited by examiner

*Primary Examiner*—Jacques Louis-Jacques
*Assistant Examiner*—Peter Poltorak
(74) *Attorney, Agent, or Firm*—Blakely, Sokoloff, Taylor & Zafman LLP

(57) ABSTRACT

A data distribution network includes a distribution-coordinating server and a plurality of client nodes. Each of the client nodes is configured to pull or push data from other clients or servers. The distribution-coordinating server monitors the locations of data sources and the statuses of data transfers between clients. By tracking the locations of data on the network and client data requests, the distribution-coordinating server can instruct the clients to perform data pushes and/or pulls to coordinate large-scale distributions of data among a multitude of clients. Metadata describing the data and clients can be exchanged between the clients and the distribution-coordinating server to coordinate the data distributions. Also, the distribution-coordinating server can be configured to coordinate data distributions through network security firewalls.

16 Claims, 7 Drawing Sheets

METHOD, SYSTEM AND ARTICLE OF MANUFACTURE FOR DATA DISTRIBUTION OVER A NETWORK

TECHNICAL FIELD

This invention relates generally to distributed data networks, and specifically, to the delivery of data to multiple recipients using a network.

BACKGROUND OF THE INVENTION

One method for transmitting data from point to point involves using electronic mail, via the Simple Mail Transfer Protocol (SMTP, RFC821 http://www.faqs.org/rfcs/rfc821.html). This protocol allows users to send messages and data packages from computer to computer. In addition, the Hypertext Transfer Protocol (HTTP, RFC 2068 http://www.faqs.org/rfcs/rfc2068.html) and File Transfer Protocol (FTP, RFC 959 http://www.faqs.org/rfcs/rfc959.html) allow individuals to transfer files between computers. In the above cases, there is a one-to-one relationship between the senders and recipients, with respect to the network bandwidth required to transfer messages and data packets.

The implementation of the above protocols has resulted in the need for intermediating servers. With intermediating servers, in order to send data from one party to another, data is usually uploaded to an intermediating server, where it is then downloaded by the intended recipient. In the case of electronic mail and SMTP, a mail message is sent from the sender's mail server to the recipient's mail server, where it is then downloaded by a recipient. Alternatively, a web site can allow files to be transmitted through HTTP, whereby a sender can post a file to the site for a recipient to download.

Each of these implementations is constrained by the limited resources of the intermediating server. For example, web sites and electronic mail servers have quotas that limit the amount of data that can be stored at a given time. This storage limit can prevent large files from being sent from user to user by way of an intermediating server.

Some users can bypass this problem by hosting their own web server or mail server. Even if a user were to switch to this practice, another potential problem remains. Specifically, the network I/O (input/output) bandwidth of the server is limited. The bandwidth limitation could be problematic in situations where an individual wishes to send a larger amount of data to a number of users. The limited I/O bandwidth would slow the process.

Some solutions to sharing I/O bandwidth of networked computers have been developed. Advanced file transfer protocols have been somewhat automated, modified, and integrated into peer-to-peer networks, such as Napster™, iMesh™, and ScourExchange™. These networks are all examples of directory-mediated file sharing. This technology in general has been useful for distributing bandwidth and reducing centralized server loads, but transfers are still manually initiated in a "pull-based" approach. Using this approach, in order to send a file, a sender sends a link to a recipient, who then manually retrieves or "pulls" the file directly from the sender's computer.

Also, a number of mirroring and caching technologies have been developed to distribute the bandwidth requirement away from centralized servers. Mirroring involves placing complete copies of downloadable content (i.e., data) onto multiple servers. These servers may be located in one location or distributed geographically.

In addition, other content distribution technologies have been developed, such as the caching technologies described in U.S. Pat. No. 6,108,703. These technologies intelligently route content among multiple servers located around the country so that users may quickly and seamlessly access the content. Another type of caching technology has been developed by Mangosoft™, Inc. This caching technology allows computers on a local network to share content downloaded from a global network onto a computer in the local network. In other words, once a computer on a LAN (local area network) has downloaded a file from a publicly-accessible network, such as the Internet, other computers on the LAN can download the file from that computer instead of having to go out on the public network. This technology is good for sharing data within a local network, but it does not provide a method for "pushing" data to the other computers inside the network. "Pushing" data means that a sender transfers data to a recipient without the recipient first requesting the transfer.

Computer viruses have been devised for pushing data onto unwitting recipients. Mail viruses such as the Melissa worm are designed to push data to multiple recipients. These viruses allow data to be sent to millions of people without coordination or bandwidth consumption from a centralized source. However, senders of these viruses have no control over their recipients and no mechanisms exist for limiting cycles in transmissions causing parties inside the network to receive multiple copies of the virus payload.

Accordingly, there is a need for an improved method and system of transferring content over a network to multiple recipients that effectively shares the bandwidth of networked computers.

DETAILED DESCRIPTION OF THE PRESENTLY PREFERRED EMBODIMENT(S)

It is an advantage of the invention to provide an improved system and method for distributing data to multiple nodes on a network efficiently by utilizing the network bandwidth of the recipient nodes. This approach reduces the bandwidth and system requirements of a centralized server or a distributed set of servers utilized by the data source. In addition to lowering costs associated with a centralized data source server, the invention can also reduce overall delivery time to recipients.

Another advantage of the invention is that it provides a method and system for the coordination of data transfers within a protected network, where the data source resides outside the protected network. This method allows computers networked behind a firewall server to receive data from external sources, such as computers connected to the Internet, without having to perform transfers through the firewall for each computer. Another benefit of this aspect of the invention is that data can be transferred at the usually higher local area network (LAN) rate of the protected network, rather than the external network rate.

Figure 1:
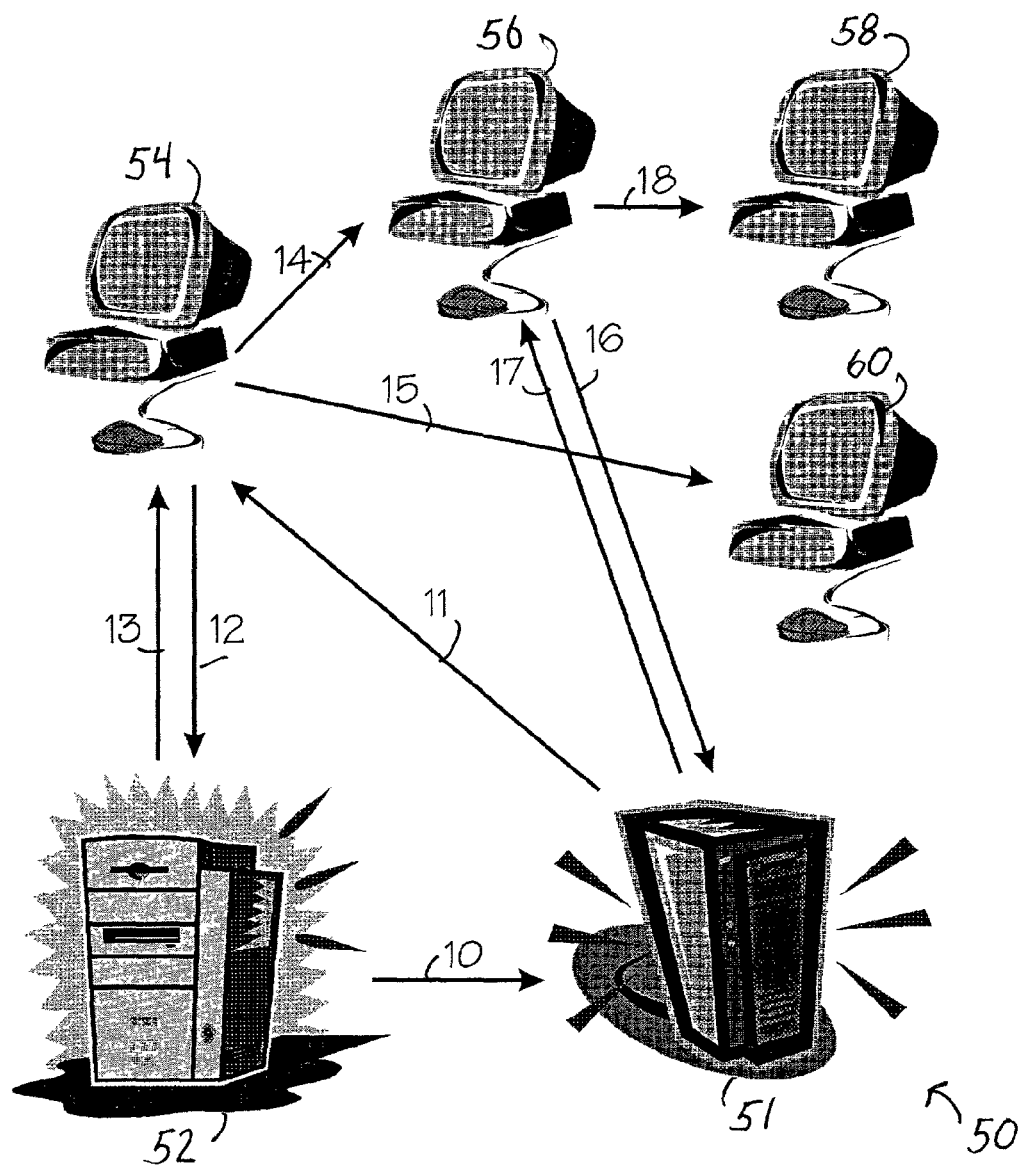
FIG. 1 illustrates an exemplary data distribution network in accordance with an embodiment of the invention.

Turning now to the drawings, and in particular to FIG. 1, there is illustrated an exemplary system 50 in accordance with an embodiment of the invention. The system 50 comprises a distribution-coordinating server 51, an initial content-providing server 52, and four destination clients 54–60. The servers 51–52 and clients 54–60 are all nodes residing on a network, such as the Internet, a corporate intranet, LAN, or the like, and can communicate with each another using commercially-available hardware and/or software components for implementing industry-standard network protocols.

Figure 2:
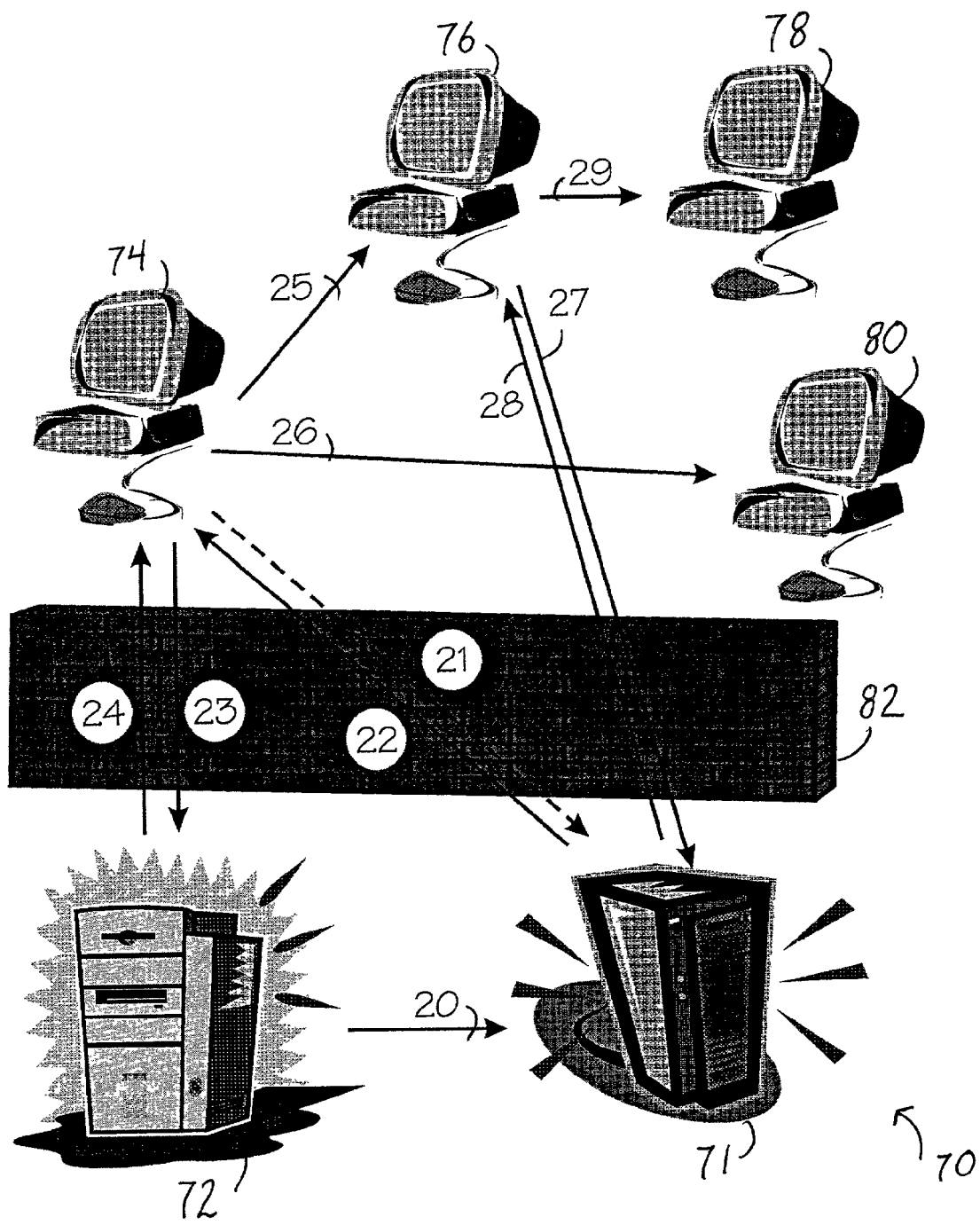
FIG. 2 illustrates an exemplary data distribution network having a firewall in accordance with another embodiment of the invention.

In FIGS. 1–2, each of the arrows 10–18, 20–29 denotes a network transaction in which one or more messages can be exchanged between nodes. The messages can include requests, data transfers, commands, instructions, metadata, and the like.

Referring to FIG. 1, initially all of the destination clients 54–60 are listening on the network for instructions output by the distribution-coordinating server 51. In one exemplary operational scenario, the data distribution process begins when the initial content-providing server 52 sends a message to the server 51 that indicates that the server 52 has data to be distributed to at least one of the four clients 54–60 (arrow 10). In response to the message, the server 51 makes a connection (arrow 11) to client 54 and sends a message indicating that there is data to retrieve from the content-providing server 52. The message can also include instructions commanding the client 54 to subsequently send the retrieved data to two of the clients 56, 60.

In response to the message from the distribution-coordinating server 51, the client 54 connects to the content-providing server 52 and requests the data (arrow 12). The requested data is then transferred from the server 52 to the client 54 (arrow 13). In accordance with the instructions from the coordinating server 51, the client 54 subsequently transfers the data to a second client 56 (arrow 14). After that transfer, a second transfer is initiated from the client 54 to the third client 60 (arrow 15).

After receiving the data from the first client 54, the second client 56 establishes a connection to the coordinating server 51 and requests a message indicating set of recipient clients to which the second client 56 is to transmit the data (arrow 16). In response to this request, the server 51 returns a message identifying the set of clients (arrow 17). In the example shown, the set of clients includes a single client, namely the fourth client 58.

Upon receiving the set of clients, the second client 56 finishes the process of propagating the data from the initial content-providing server 52 by transferring the data to the fourth client 58 (arrow 18).

FIG. 2 shows a system 70 in accordance with another embodiment of the invention. The system 70 of FIG. 2 is similar to the system 50 of FIG. 1. However, the system 70 of FIG. 2 includes a firewall server 82. In the system 70, the clients 74–80 are connected to and communicate over a protected network behind the firewall 82. The firewall 82 separates the network connecting the clients 74–80 from the network connecting the initial content-providing server 72 and the distribution-coordinating server 71. Specifically, the firewall 82 can be configured to prohibit external connections to the clients 74–80, and only allow connections from the clients 74–80 to nodes on the external network, where servers 71–72 are located.

The firewall server 82 can be a conventional networked server running a commercially-available firewall software program, such as one available from Checkpoint Software, Inc.

In an exemplary operational scenario involving the system 70, each of the clients 74–80 can be configured to regularly poll the distribution server 71 to determine whether there is data to be retrieved. This is shown only for the first client 74 (dashed arrow 21). In order to receive data distributions through the firewall 82, at least one of the clients 74–80 pulls data from an external source, such as the initial content-providing server 72, and then transfers the data to other clients over the protected network.

When data is available for distribution, the content-providing server 72 so indicates to distribution server 71 by a message (arrow 20). Upon being subsequently polled by one of the clients 74, the distribution server 71 indicates the presence of distributable data to the client 74 by returning a message containing transmission instructions (arrow 22). The transmission instructions can include information regarding the location of the data, as well as a set of clients indicating downstream recipients of the data.

The client 74 then proceeds to pull the data from the content-providing server 72. The client 74 accomplishes this by making a request through the firewall 82 to the server 72 to receive the data (arrow 23). In response to the request, the server 72 transfers the data to the client 74 (arrow 24). Since the client 74 resides behind the firewall 82, it can establish connections to the other clients 76–80, and thus, push data to them. Accordingly, the client 74 subsequently transfers the data to some of the other clients 76, 80 (arrows 25–26).

After receiving the data from the first client 74, the second client 76 establishes a connection to the coordinating server 71 and requests a message indicating set of recipient clients to which the second client 76 is to transmit the data (arrow 27). In response to this request, the server 71 returns a message identifying the set of clients (arrow 28). In the example shown, the set of clients includes a single client, namely the fourth client 78.

Upon receiving the set of clients, the second client 76 finishes the process of propagating the data from the initial content-providing server 72 by transferring the data to the fourth client 78 (arrow 29).

Although not shown in FIG. 2, a client behind the firewall 82 can be configured to push data out to a recipient outside the firewall 82. Alternatively, a client behind the firewall 82 may retrieve data from a recipient client outside the firewall 82 that has received the data, rather than the initial content-providing server 72.

The invention is not limited to the network architectures, topologies, or protocols disclosed herein, nor is it limited to the hardware and software component described herein. In addition, the particular designation and numbers of clients and servers in FIGS. 1–2 are provided for illustrative purposes. It should also be noted that a network node can function as both a client and server.

As an example, a client or server in either system 50,70 can be an Intel-compatible personal computer (PC), with a commercially-available network interface, such as an Ethernet card. The PC can include a Microsoft Windows™ operating system with properly installed network support, and can also include one or more computer programs for configuring the PC to perform at least some of the functions and methods described herein.

Further, the methods and systems described herein can be implemented on one or more computer networks based on TCP/IP and/or HTTP. However, the invention is not limited to TCP/IP-based or HTTP-based networks, and the methods and systems of the invention can rely on alternative network protocols.

In terms of implementation of the invention using software programs, there are alternative programming approaches. Such approaches include, but are not limited to, software programs implementing the methods disclosed herein as separate processes, as multiple threads within the same process, or as a single thread with a state machine to differentiate functionalities of the methods. Likewise, multiple invocations of the same method can run simultaneously on a single computer, so a client or server can be capable of handling multiple simultaneous connections.

The software programs can be stored on a computer-usable medium, such as one or more computer memory devices, such as CD-ROMs, diskettes, hard drives, DVDs, solid-state memories, and the like.

Furthermore, the networked nodes 51–60, 71–82 can include appropriate exception-handling mechanisms, such as recovery from an unexpected disconnection, and security precautions, such as encryption, to ensure that the modules outlined below will function in a secure, robust, and fault-tolerant manner. In addition, the nodes 51–60, 71–82 can include software and/or hardware components for verifying user authenticity and the integrity of data being transferred. For example, the nodes can perform data integrity checks using hashing or checksum techniques, such as an MD5 hash, or other suitable coding techniques. Components for the compression, encryption, authenticity and data integrity functions are commercially-available for PC-based nodes.

Throughout the data distribution process, various networked components, such as the clients and server, need to exchange information about each other and about the data being sent between them. This can be accomplished through the use of metadata. The metadata can be included in messages passed between the components.

In the case of data transmission, the metadata can consist of a GUID (Globally Unique Identifier), an MD5 hash, file name, creation time, file size, and/or some similar series of bits that can uniquely denote or describe the data without explicitly sending the data in its entirety. Thus, for example, when a client notifies the server that it has received a file, the client sends only the metadata to the server rather than the full file.

In the case of clients, the metadata can represent the client identity and location, such as an IP address, a DNS entry or system name, a MAC address, or the like. Client metadata can denote a plurality of clients as well, thus allowing simultaneous reference to more than one node. The use of metadata facilitates multicast distribution across a sub-network, as well as the specific targeting of recipients of data through multiple unicasts.

To aid in the understanding of the following description of FIGS. 3–7, network connections can be, for example, TCP/IP socket connections to remote modules (e.g., other client nodes or distribution-coordinating servers).

Figure 3:
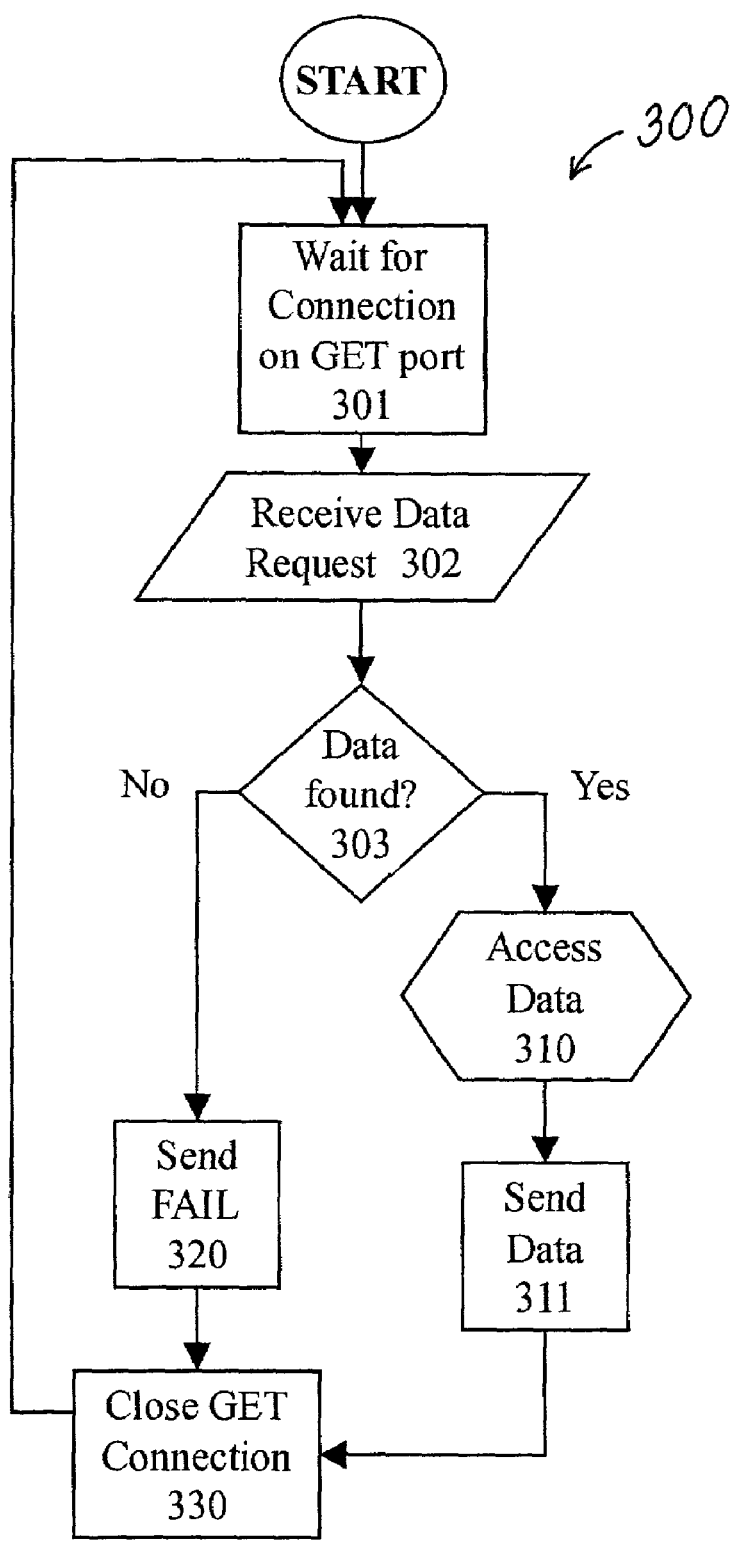
FIG. 3 is a flowchart illustrating a method of pulling data from a client or server includable in the networks of FIGS. 1–2.

FIG. 3 is a flowchart 300 illustrating a method of pulling data from a client or server includable in the networks of FIGS. 1–2. The method in FIG. 3, referred to herein as the Client GET method, enables a remote module to request data from a client node and have the client send that data to the remote module. The Client GET method allows clients behind firewalls to retrieve data from external clients, though the method is not restricted to that specific usage.

As an illustration, in the distribution scheme outlined in FIG. 2, the Client GET method would be invoked and executed on server 72, and the client 74 would be the remote module. The connection/data requests and data delivery correspond to arrows 23–24, respectively.

The client or server executing the Client GET method waits for the remote module to establish a connection (step 301) and request data (step 302) by exchanging metadata, such as a Globally Unique Identifier (or GUID), or some equivalent token that denotes the desired data. In step 303, the client checks its records to determine whether it has the requested data (i.e., a data file corresponding to the metadata of the request). If the client has the requested data, it retrieves it from storage (step 310) and sends it to the remote module (step 311). Otherwise, the client notifies the remote module that it cannot provide the desired data (step 320). In either event, the client then closes the connection (step 330) and returns to step 301 to wait for new connection requests.

Figure 4:
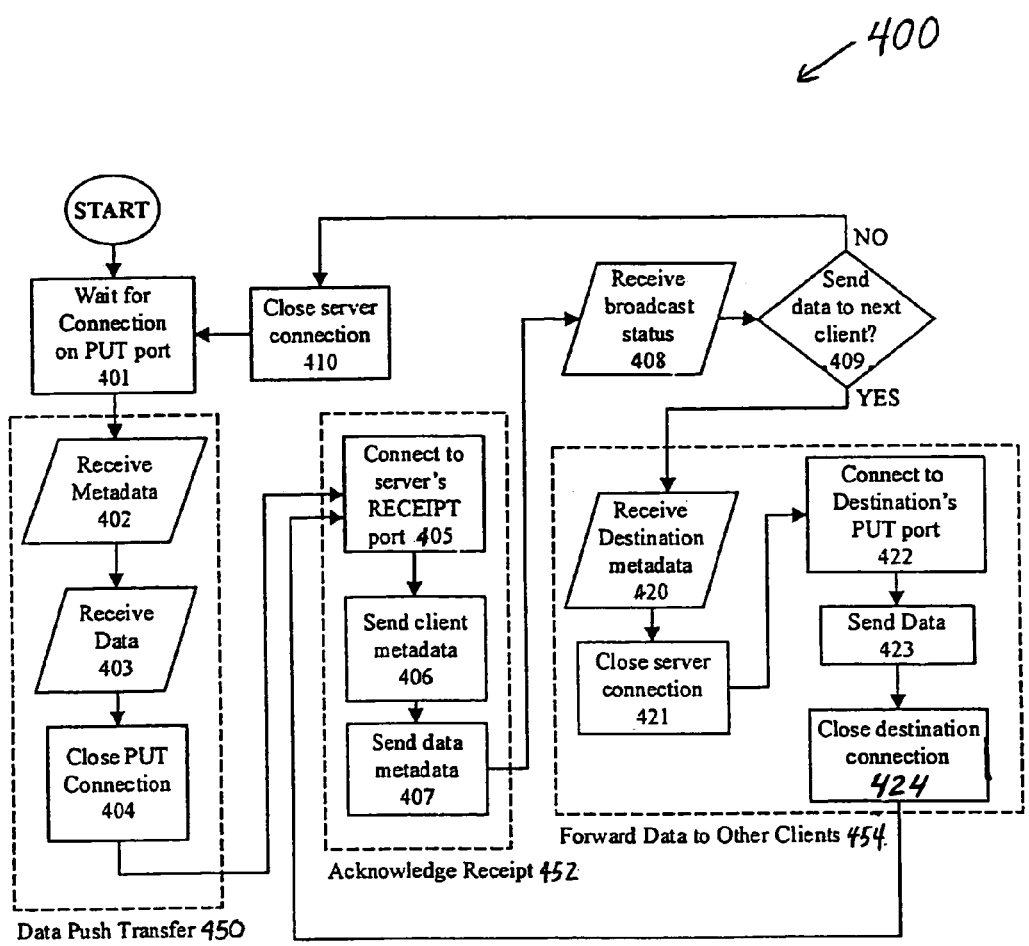
FIG. 4 is a flowchart illustrating a method of pushing data to a client includable in the networks of FIGS. 1–2.

FIG. 4 is a flowchart 400 illustrating a method of pushing data to a client includable in the networks of FIGS. 1–2. The method, referred to herein as the Client PUT method, describes how a remote module may push data to a client. For example, in FIG. 2, the data transfer depicted by the arrow 25 can be facilitated by the Client PUT method running on the second client 76. From the perspective of the second client 76, the first client 74 acts as a remote module that establishes a connection and then pushes data.

The first operation of the Client PUT method is the data push transfer 450 from the remote module to the client. When a remote module connects (step 401), the client receives a description (step 402) of the data it is about to receive. This description, which can have zero length, can include metadata corresponding to the data, and may also include information such as the size, author, and date of creation of the data. In step 403, the client receives the data and then closes the connection to the remote module (step 404).

The second operation of the Client PUT method is the acknowledge receipt 452. Upon receiving the data from the remote module, the client notifies the distribution-coordinating server 51, 71 of its new data acquisition. This allows the distribution-coordinating server to track the flow of the data and ensure full and proper distribution. The client accomplishes this by connecting to the server RECEIPT port of the distribution-coordination server (step 405). The client notifies the server of the client's identity (step 406) and of the identity (or metadata) of the data that it recently received from the remote module (step 407).

The third operation of the Client PUT method is to forward the data to other clients 454. Since the client has the data, the distribution-coordinating server can direct the client to broadcast the data across the network to other recipients. Upon receiving notification that the client has received the data, the coordinating server replies with a broadcast status message (step 408).

Figure 7:
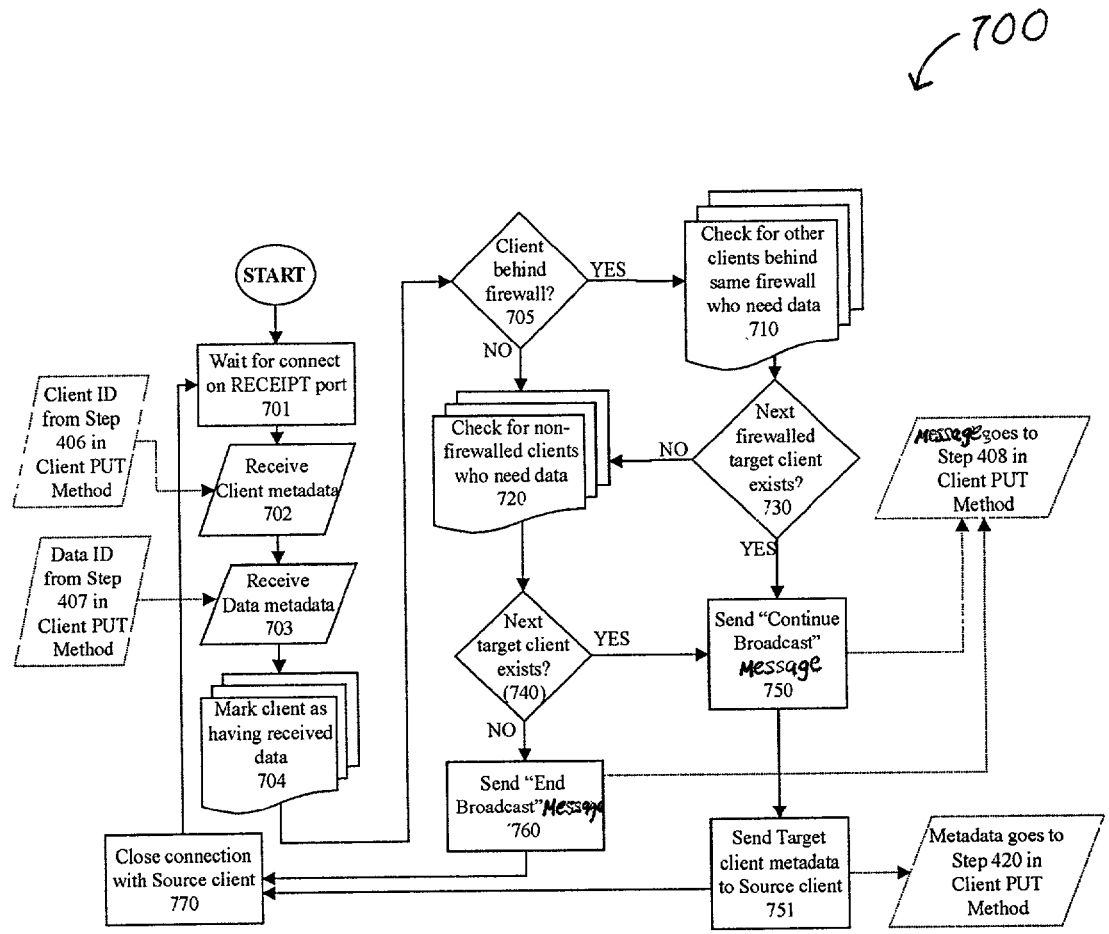
FIG. 7 is a flowchart illustrating a receipt operation of a distribution-coordinating server for instructing a client to send a file to another client.

The message instructs the client to either terminate broadcast (step 760, FIG. 7) or to forward the data to other clients (step 750, FIG. 7). The client receives this message and selects a subsequent course of action based on the message (step 409). If the server has declared the broadcast to be finished, the client closes its connection to the server (step 410), and resumes waiting for connections (step 401). If the server declares that the broadcast of the data should continue, however, the client then receives metadata (for example, an IP address) identifying one or more destination clients to send the data (step 420), and subsequently closes the connection to the server (step 421).

Acting as a remote module, the client then sends a connection request on the PUT port of the destination client, invoking the Client PUT method on the destination client (step 422). Upon successfully establishing a connection, the client sends the data to the destination client (step 423), and the closes the connection to the destination client (step 424).

The client then notifies the coordinating server to determine if there are additional destination clients, if any, by looping back to step 405. This can occur simultaneously with an equivalent action by the destination client, which likewise connects to the coordinating server and requests a new destination client. Since the Client PUT method on a client can invoke the Client PUT method on at least one destination client, the data distribution process as a whole can self-propagate.

The method described in connection with FIG. 4 assumes that the client queries the coordinating server for a new destination client address after the completion of every data transfer. Though this is one approach, a client can instead buffer a set of destination client addresses given to it by the server, and use those destination addresses for subsequent data pushes to other destination clients. This modification could alleviate the load on the server in the case of distributions to a large number of destinations.

According to one aspect of the invention, the clients can send and receive data simultaneously. In other words, such an implementation allows a recipient client to transfer data to other clients while it is receiving that same data, resulting in a shorter overall distribution time. Such an implementation can be accomplished if, for example, the transition from step 421 to step 422 involves the spawning of a new thread. The newly launched thread can handle steps 423, 424, and 425 on its own. The launching thread can then return to 405 and request new destination clients to handle simultaneously.

Figure 5:
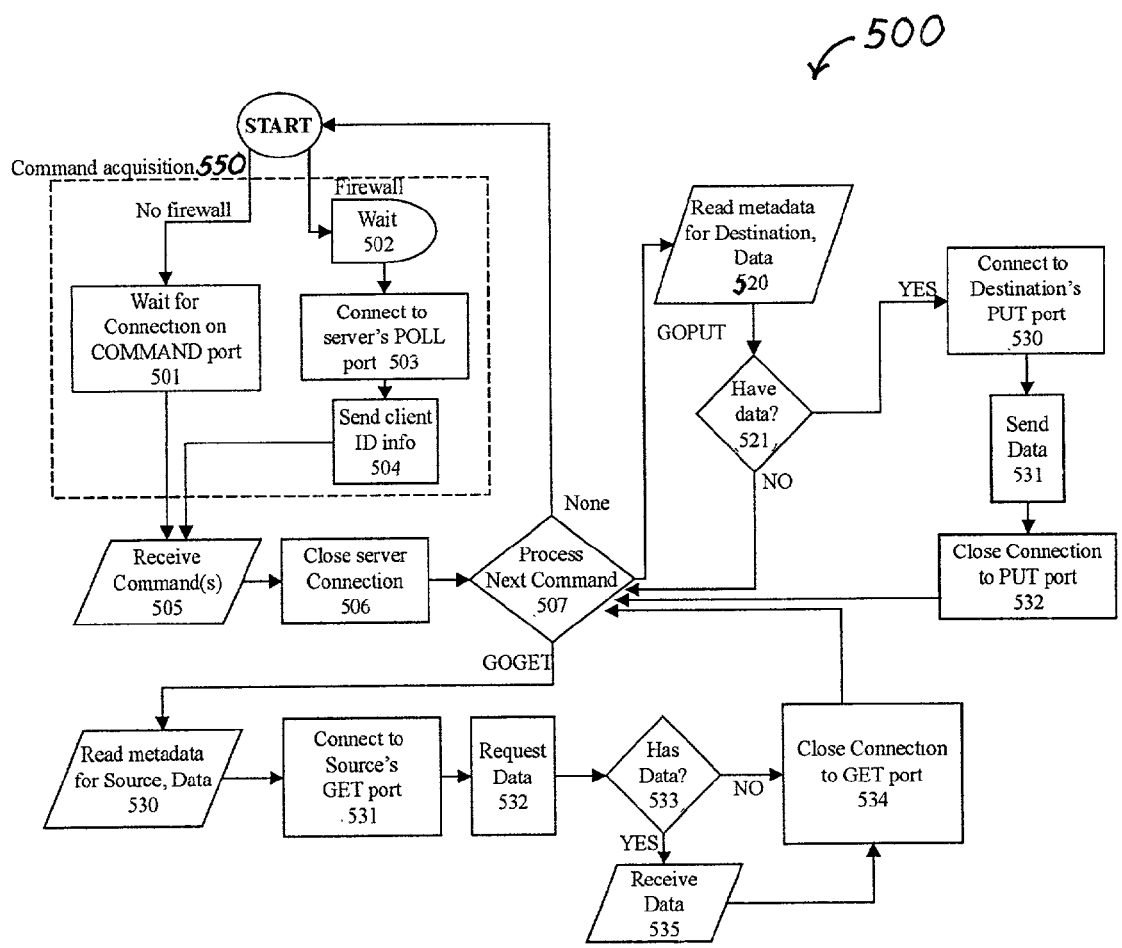
FIG. 5 is a flowchart illustrating a client process for sending and receiving data to and from other clients.

FIG. 5 is a flowchart 500 illustrating a client process for responding to commands from the distribution-coordinating server to send and receive data to and from other clients. The method, referred to herein as the Client COMMAND method, allows the distribution-coordinating server to coordinate a client's data transfer actions.

For example, referring to FIG. 2, in the data transmission depicted by arrow 22, the coordinating server 71 instructs the client 74 to retrieve data from content-providing server 72, and to send that data to the second and third clients 76, 80. By the terminology presented in FIG. 5, this means that the server 71 sends the client 74 a GOGET command to acquire the data from the server 72 and at least one GOPUT command to distribute the data to the clients 76, 80. The server 71 is able to issue these commands to the client 74 because the client 74 is running the Client COMMAND method.

The first operation of the Client COMMAND method is the command acquisition 530. The process by which a client acquires server commands is slightly different depending on whether the client is behind a firewall. In the case of an open client, e.g., one that is on the same subnet as the server, the client waits for the coordinating server (or another external module, such as a troubleshooting or debugging tool) to establish a connection (step 501).

If the client is behind a firewall, however, the server is typically not able to directly connect to the client. Thus, the client periodically polls the coordinating server to check for new commands stored by the coordinating server. After waiting for a predefined interval (step 502), the firewalled client requests a connection to the coordinating server and invokes a Server POLL method at the coordinating server (step 503) and identifies itself to the server by sending a client ID (step 504). The Server POLL method is described in connection with FIG. 6.

The client then receives a command or block of commands from the coordinating server (step 505), and then closes the connection to the server (step 506). The client buffers the command(s) and then enters a loop in which it iterates through each command in the block, parses it, and acts on it (step 507). When there are no commands in the buffer, the client loops back to its command acquisition operation 550 for acquiring new server commands.

If the command is a GOGET command, the client proceeds to acquire data using a pull-based approach. The GOGET command can be used to allow a client behind a firewall to retrieve a file from an open client or one that's behind the same firewall. The GOGET command can also be used to initiate broadcast transmissions.

When the coordinating server sends a GOGET command, it also sends metadata specifying the source client address and data identifiers corresponding to the data the client is to retrieve (step 530). The client then connects to the source client (step 531), usually by invoking the Client GET method at the source client. The client requests the data from the source client (step 532). A check is made to determine if the source client has the requested data (step 533). If the source client has the data, the client receives the data (step 535). The client then closes the connection (step 534) and loops back to step 507 to process the next command.

This method can be made to integrate seamlessly with HTTP. For example, if the metadata transmitted in step 530 specifies a uniform resource locator (URL), the client can simply connect to this URL via the HTTP port and receive the data at the URL in a manner similar to that of a web-browser. This approach can be modified to download data via other file transmission protocols, such as FTP.

The GOPUT command causes a client to push data to a specified recipient, in a manner similar to that described in connection with forward data to other clients operation 454 of FIG. 4. This GOPUT command allows clients behind firewalls to send data to clients outside firewalls, and can also be useful for facilitating non-broadcast, point-to-point transmissions (such as emails, individual file transfers, or the like). This command provides for a distributed file-sharing mechanism or a point-to-point email tool.

A client handles a GOPUT command by parsing the metadata for the data and a destination client that is to receive the data (step 520). A check is made to determine if the client has the specified data (step 521). If the client has the specified data, it connects to the PUT port of the destination client (step 530), sends the data (step 531), and then closes the connection to the destination client (step 532).

Figure 6:
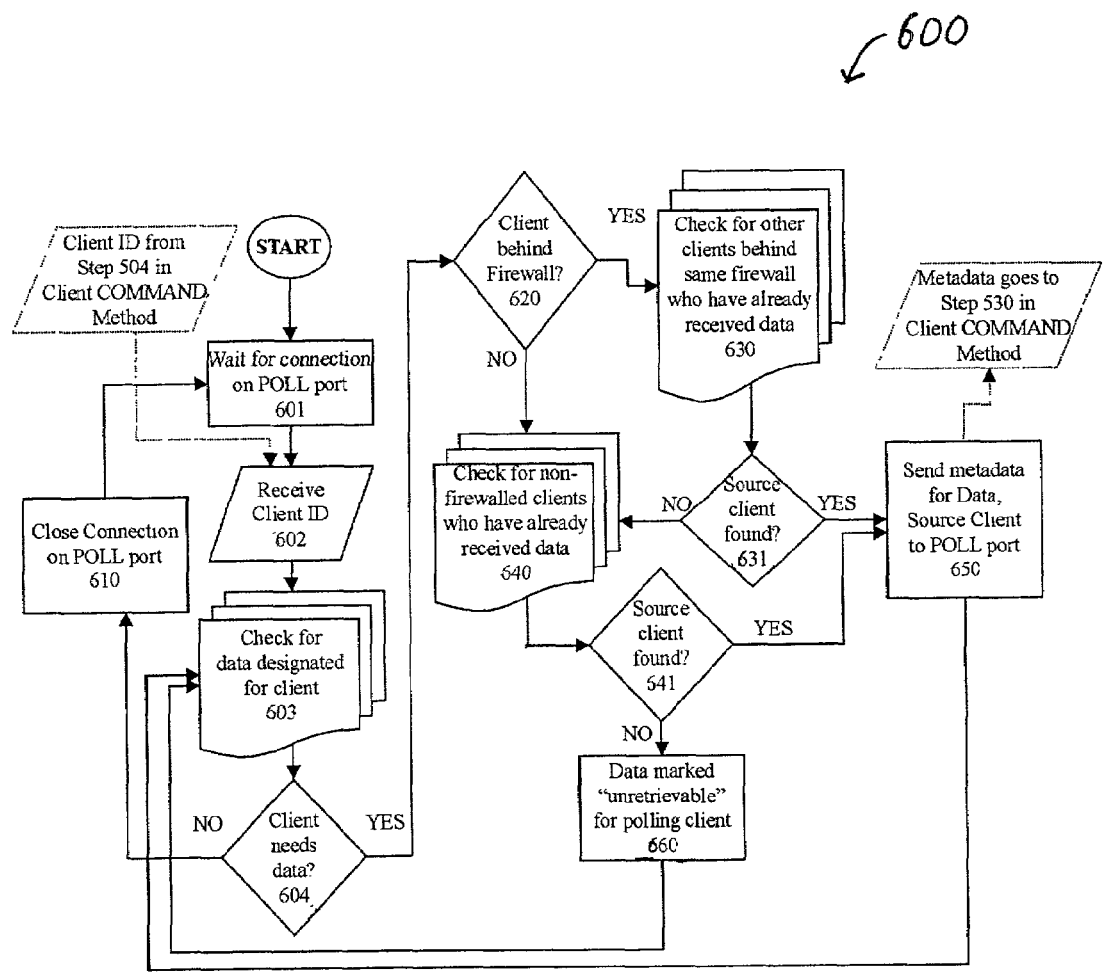
FIG. 6 is a flowchart illustrating a polling operation of a distribution-coordinating server includable in the networks of FIGS. 1–2.

FIGS. 6 and 7 describe the functionality of the distribution-coordinating servers 51, 71 shown in FIGS. 1–2. The role of the servers 51,71 is to coordinate transactions between clients to ensure that clients on a distribution list receive data intended for them. The servers 51, 71, which can be implemented using one or more computers, keep track of nodes that have data, and facilitate the transmission of that data to those nodes that request the data but do not yet have it. Distribution lists and records of clients requesting data and those clients storing data can be stored in databases accessible to the servers 51, 71.

The distribution-coordinating servers 51,71 can be configured to determine optimal data flow across the network. Optimal data distribution rates can be determined based on a number of useful heuristics, such as network topology, relative bandwidths between nodes, and physical locations of nodes.

FIG. 6 is a flowchart 600 illustrating a polling operation of a distribution-coordinating server includable in the networks of FIGS. 1–2. The method, referred to herein as the Server POLL method, describes how the distribution-coordinating server can instruct a client to retrieve, i.e., pull, data from another source (usually another client). Since data is usually pushed to clients by default rather than having clients pull the data themselves, a client would only need to invoke this server-side method in circumstances in which other clients are unable to push data to it. Such circumstances arise when a client is behind a firewall, or when it first subscribes to a service and needs to be added to a distribution list.

In step 601, the distribution-coordinating server waits for clients to invoke its Server POLL method by requesting a connection on the server's POLL port. When a client requests a connection, the server identifies the client by receiving its metadata (step 602).

The server then checks whether the client is on a distribution list for a particular piece of data but has not yet received that data (steps 603–604). If the server's records show no data destined for the client, the server closes the connection with the client (step 610) and returns to waiting for new connections (step 601).

If the client needs data, however, the server then looks for a node from which the client can retrieve this data, referred to in the flowchart as the source client. A check is made to determine whether the client is behind a firewall (step 620). The coordinating server can compare the IP address of the client to determine whether the client resides behind a firewall. Specifically, the server can store a list of IP addresses for firewall servers. If the IP address of the client corresponds to one of the firewalls in the list, then the coordinating server can treat the client as a firewalled client.

If the client is a firewalled client, the coordinating server first checks for source clients behind the same firewall that already have the data (step 630), and uses such a client if it exists (step 631). A source client behind the same firewall allows the system to take advantage of the higher speeds usually achieved by subnets and to aid in the ability to propagate data throughout subnets protected by firewalls.

If the client is not firewalled, or if no other clients behind the firewall have the desired data, the server searches its records for a non-firewalled client that has the data (step 640).

If a source client is successfully found, the server refers the client to the source client by sending it metadata to identify the data and the location of the source client from which it should retrieve the data (step 650). On the other hand, if a suitable source client is still not found, the server can mark the data as temporarily irretrievable by the polling client (step 660), or permanently irretrievable if a suitable source client is not found after repeated attempts.

In locating source clients, the server can check its records for the status of all non-firewalled nodes. If a source contains incomplete data, the server can resume checking for data still owed to the client (not counting the data it has already handled) by looping back to step 603, and thus handles all data the polling client requests at the time of the Server POLL method invocation.

The transmission of files across two systems that are behind different firewalls can be handled through the introduction of an intermediary system, i.e., another client node that is not behind a firewall. Data that is to be transferred from one firewalled client to a client behind another firewall is first transferred to this intermediary, and then forwarded to the firewalled recipient through the coordinated method described above in connection with FIG. 6. Such a use of an intermediary system allows separately firewalled clients to perform data transfers between one another without burdening the coordinating server with the double transmission of the data.

FIG. 7 is a flowchart 700 illustrating a receipt operation of a distribution-coordinating server for instructing a client to send a file to another client. The method, referred to herein as the Server RECEIPT method can be invoked on a server by a client running the Client PUT method. The Server RECEIPT method allows for the client to push the data off to more clients as needed.

A client invokes this method by sending a connection request to the server on the server's RECEIPT port. In step 701, the server wait to receive the request. In step 702–703, after receiving a request and establishing a connection, the server receives a client ID (metadata) and the data metadata. The server then updates its records to indicate that the client has received the data (step 704). This can prevent the server from trying to send the same data to the same client again as the distribution process continues.

The server then checks its records for other clients that need the data but have not yet received it, so that it can command the connected client to send the data to them. As before, a special case is made for clients behind firewalls (step 705), where preferential treatment is given to clients who share a firewalled sub-network. A client behind a firewall generally cannot receive external connections, and therefore, can only receive pushed data from another client behind the same firewall. Thus, if the connected client is behind a firewall, the server looks for another client behind the same firewall that needs the same data (step 710) and, if such a client exists (step 730), uses it as the destination client. If no such client exists, or if the connected client is not behind a firewall, the server checks its records for non-firewalled clients that likewise need the data (step 720). If this search fails to return destination clients (step 740), the server sends the connected client an "end broadcast" message (step 760) indicating that the data distribution task is complete and that no further action needs to be taken.

On the other hand, if a destination client is found, the server sends the connected client a "continue broadcast" message (step 750) followed by metadata denoting the identity of the destination client (step 751). In either event, the server then closes its connection with the client (step 770) and resumes waiting for new connections.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

We claim:

1. A method for distributing data to a plurality of networked nodes, comprising:

transferring to a distribution server a notice of distributable data, the distributable data existing on a content server;

selecting from the plurality of networked nodes a list of one or more recipient nodes to receive the distributable data;

prompting the distribution server to transfer instructions to a first networked node from among the recipient nodes, said instructions including an address for the content server, an identifier for the distributable data, the list of recipient nodes, and commands for dissemination of the distributable data among the recipient nodes by the first networked node, the dissemination avoiding interaction between the first networked node and both the distribution server and the content server;

transferring a request from the first networked node to the content server in response to the instructions, the request including a node identifier for the first networked node, and the identifier for the distributable data;

transferring the distributable data from the content server to the first networked node in response to the request; and disseminating the distributable data from the first networked node according to the commands contained in the instructions.

2. The method of claim 1, wherein prompting of the distribution server to transfer instructions is done by the content server.

3. The method of claim 1, wherein prompting of the distribution server to transfer instructions is done by polling of the distribution server by the first networked node.

4. The method of claim 1, wherein the first networked node begins to disseminate the distributable data prior to completely receiving the data at the first networked node.

5. The method of claim 1, wherein the location of distributable data on a content server is transferred to the distribution server from a second content server.

6. The method of claim 1, wherein the commands for disseminating distributable data result in a plurality of transfers from the first networked node to other recipient nodes.

7. The method of claim 1, wherein the commands for disseminating distributable data result in cascading the data to others of the recipient nodes.

8. The method of claim 1, wherein at least one of the networked nodes resides on a protected network separated from the distribution server by a firewall.

9. The method of claim 8, wherein the first networked node polls the distribution server at predetermined intervals in order to prompt the transfer of the instructions.

10. A system comprising:

a plurality of nodes capable of communicating with one another over a network; and a distribution server, operatively coupled to the plurality of nodes by way of the network transferring instructions to at least one of the nodes in response to polling by the at least one of the nodes, the instructions including an address of a content server, the instructions directing the at least one of the nodes to disseminate among the nodes data received from the content server, the dissemination avoiding interaction between the first networked node and both the distribution server and the content server.

11. The system of claim 10, further comprising:

a firewall server operatively coupled to the plurality of nodes.

12. The system of claim 11, wherein the firewall server is configured to prevent the distribution server from requesting a connection to one or more of the nodes.

13. The system of claim 12, wherein at least one of the nodes includes means for polling the distribution server at predetermined intervals to receive the instructions.

14. The system of claim 10, wherein at least one of the nodes is configured to check the integrity of the data.

15. The system of claim 10, wherein at least one of the nodes is configured to encrypt the data.

16. The system of claim 10, wherein at least one of the nodes is configured to compress the data.

* * * * *